John L. Margrave
Ramachandra B. Badachhape
James L. Wood
Richard J. Lagow
INVENTORS BY *Larry B. Feldcamp*

ATTORNEY

United States Patent Office 3,674,432
Patented July 4, 1972

3,674,432
SUPERSTOICHIOMETRIC CARBON MONOFLU-
ORIDE AND METHODS FOR PREPARING
STABLE CARBON MONOFLUORIDES OF
VARIOUS STOICHIOMETRIES
John L. Margrave, Houston, and Ramachandra B. Bad-
achhape, Hempstead, Tex., James L. Wood, Nashville,
Tenn., and Richard J. Lagow, Houston, Tex., assignors
to R. I. Patents, Inc., Houston, Tex.
Filed Oct. 20, 1969, Ser. No. 867,678
Int. Cl. C01b 7/00
U.S. Cl. 23—205
36 Claims

ABSTRACT OF THE DISCLOSURE

Stable carbon monofluoride having a maximum superstoichiometric fluorine-to-carbon ratio and controlled, reproducible methods for preparing stable carbon monofluorides including carbon monofluoride films on various shapes of solid carbon, both at atmospheric pressure and at superatmospheric pressures. The prior method of preparing carbon monofluorides at atmospheric pressure by reacting fluorine and graphite at a temperature in the range from about 400° C. to about 600° C. is made reproducible by controlling the reaction temperature so that it does not vary more than ±3° C. Stable superstoichiometric carbon monofluorides can be prepared at atmospheric pressure by reacting carbon and fluorine at a temperature in the range from about 620° C. to about 635° C. and maintaining the temperature for such a period of time as to allow the reaction to go substantially to completion. Approximately one to three hours is needed at temperatures in this range to form stable carbon monofluoride films. At temperatures between about 624° C. and about 630° C. a carbon monofluoride having a maximum superstoichiometric fluorine-to-carbon ratio of approximately 1.12/1.00 can be produced. Stable carbon monofluorides having superstoichiometric proportions of fluorine and carbon can also be prepared at superatmospheric pressures, with the addition of heat at pressures up to about 225 p.s.i.a. and without the addition of heat at pressures between about 225 p.s.i.a. and about 250 p.s.i.a.

LICENSE TO THE U.S. GOVERNMENT

A non-exclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION (1) Field of the invention

This invention relates generally to a carbon monofluoride having a maximum superstoichiometric fluorine-to-carbon ratio and to methods for preparing carbon monofluorides having various stoichiometries by the fluorination of carbon.

(2) Description of the prior art

The only previously known method for preparing carbon monofluorides was the direct reaction of fluorine gas and graphite at temperatures in the range from 400° C. to 600° C. Until the present invention, temperatures in excess of 600° C. were claimed to produce unstable products or to cause explosive or uncontrollable reactions, thus resulting in the production of other fluorocarbon compounds, such as carbon tetrafluoride.

The method of preparing carbon monofluorides by reacting fluorine gas with graphite at a temperature within the range of 400° C. to 600° C. has been regarded by those in the art as having poor reproducibility, especially when attempting to obtain carbon monofluorides of high fluorine-content. It has been reported that a carbon monofluoride having a whitish color and a fluorine-to-carbon ratio of 0.99/1.00 has been obtained by using this method but that more frequently the reaction product has a darker color and a lower fluorine-content, in the range of fluorine to carbon ratios of 0.7/1.0 to 0.8/1.0.

As the result of the poor reproducibility of this method for preparing carbon monofluorides of high fluorine-content, the occasional explosiveness or uncontrollability of the reaction between graphite and fluorine gas at high temperatures, and the unstable nature of the reaction products, the exploitation of the use of carbon monofluorides as solid lubricants and the development of other possible uses of these compounds have been restricted, especially on a commercial basis.

SUMMARY OF THE INVENTION

The object of the present invention is to provide a controlled, reproducible method for preparing stable carbon monofluorides of various stoichiometries, including films, from carbon and fluorine and, in particular, carbon monofluorides having fluorine-to-carbon ratios greater than 0.99/1.00. It is the further object of this invention to produce a carbon monofluoride having a maximum superstoichiometric fluorine-to-carbon ratio and to provide a controlled, reproducible method for preparing the same.

In the atmospheric preparation of carbon monofluorides, precise control of the reaction temperature has been found to obviate the previous problem of poor reproducibility. By preventing the variation of the reaction temperature by more than ±3° C., carbon monofluorides having desired fluorine-to-carbon ratios can be reproduced without any difficulty.

It has also been discovered that at substantially atmospheric pressure stable carbon monofluorides can be prepared from carbon and fluorine gas at temperatures which were previously thought to cause explosive reactions or unstable products, namely 600° C. to 645° C. Carbon monofluorides having fluorine-to-carbon ratios greater than 0.99/1.00 can be produced at temperatures between about 620° C. and about 635° C. Furthermore, by operating within the approximate temperature range of 624° C. to 630° C., a stable carbon monofluoride having a maximum superstoichiometric fluorine-to-carbon ratio of approximately 1.12/1.00, as contrasted to the previous reported high fluorine-to-carbon ratio of 0.99/1.00, can be produced without any problem as to uncontrollability of the reaction or unstable reaction product. Either a fixed bed apparatus or a fluidized bed apparatus can be used in the atmospheric preparation of carbon monofluorides in accordance with this invention.

It has further been found that carbon monofluorides having superstoichiometric fluorine-to-carbon ratios can be quickly prepared from carbon and fluorine gas at superatmospheric pressures with or without the addition of heat. At a particular temperature, the pressure required to produce a carbon monofluoride having a maximum superstoichiometric fluorine-to-carbon ratio is the pressure at which a pressure drop occurs as the fluorine gas pressure is increased at that particular temperature. It has been found that the carbon and fluorine gas must be heated above room temperature to initiate the reaction for pressures below about 225 p.s.i.a. but that between about 225 p.s.i.a. and 250 p.s.i.a. no heat is required as the reaction is essentially spontaneous at room temperature.

By being able to produce stable, high-fluorine content carbon monofluorides, the lubricating characteristics of carbon monofluorides, such as stability in oxidizing atmospheres at temperatures as high as 800° C. and wear and load carrying capacity, can be realized to their fullest extent. It has also been found that a carbon monofluoride which has a maximum superstoichiometric fluorine-to-carbon ratio of approximately 1.12/1.00 is significantly more stable than carbon monofluorides having fluorine-to-carbon ratios of 0.99/1.00 or less.

A further object of the present invention is the provision of a method for producing stable carbon monofluoride films on various shapes of solid carbon, such as rods, balls, plates, hollow cylinders and gaskets. Carbon monofluoride films can be produced at either atmospheric pressure or superatmospheric pressures at the reaction temperatures described above. At atmospheric pressure, the optimum film thickness is obtained by maintaining the reaction temperature for approximately one to three hours.

DESCRIPTION OF THE PREFERRED EMBODIMENTS

Figure 1:
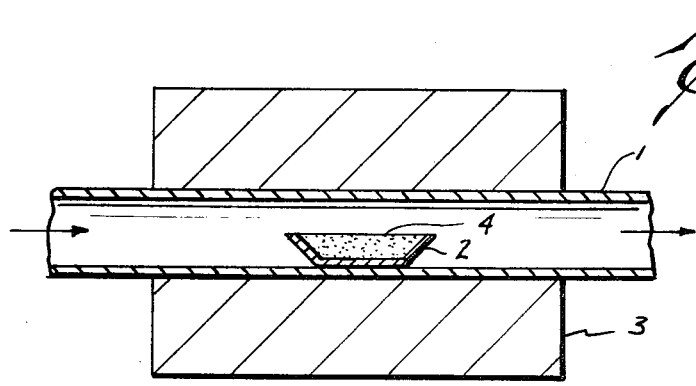
FIG. 1 is an elevation of a fixed bed apparatus through which a vertical transverse section has been taken.

Carbon monofluorides can be produced from elemental fluorine and graphite, or those forms of carbon having some graphitic structural characteristics, such as graphitic carbon black. Graphite, as the term is normally used, is a crystalline allotropic form of carbon characterized by a hexagonal arrangement of the atoms. Since practically all forms of carbon have some graphitic structural characteristics, and thus can be used in accordance with this invention, the term carbon will be used to describe the general class of materials that can be reacted with fluorine to form carbon monofluorides. However, the most efficient conversion of carbon and fluorine to carbon monofluorides occurs when graphite or those forms of carbon exhibiting strong graphitic structural characteristics are reacted with fluorine.

Also included within the definition of the term carbon are all physical forms of carbon, including particulate carbon, carbon fibers and filaments, and various shapes of solid carbon, such as rods, spheres, plates, gaskets and hollow cylinders.

It had previously been thought that the maximum fluorine-to-carbon ratio for carbon monofluorides was the stoichiometric ratio of 1.0/1.0, that is, one fluorine atom combining with each carbon atom. Prior to the present invention, substoichiometric fluorine-to-carbon ratios ranging from 0.7/1.0 to 0.8/1.0 were generally obtained, with the highest reported ratio being 0.99/1.00. However, it has been discovered that superstoichiometric carbon monofluorides exist, that is, carbon monofluorides having fluorine-to-carbon ratios greater than 1.0/1.0. The maximum superstoichiometric fluorine-to-carbon ratio has been found to be approximately 1.12/1.00. For large particles of carbon monofluorides, the maximum fluorine-to-carbon ratio may be slightly less than 1.12/1.00 because of the geometry of the particles.

Tests made on superstoichiometric carbon monofluorides indicate that two fluorine atoms are attached to each of the edge carbon atoms in axial and equitorial positions in the graphite-like crystalline structure, thus accounting for the fluorine-to-carbon ratio being greater than the stoichiometric ratio of 1.0/1.0.

The new and different characteristics of a carbon monofluoride having a maximum superstoichiometric fluorine-to-carbon ratio of approximately 1.12/1.00 as contrasted to carbon monofluorides having substoichiometric ratios of 0.99/1.00 or less, as described in the prior art, can be seen from a test indicating the relative stabilities of different fluorine-content carbon monofluorides. As contrasted to the combustion temperature of graphite in one atmosphere of pure oxygen of 627° C., the combustion temperature of a carbon monofluoride having a fluorine-to-carbon ratio of 0.68/1.00 is only 3° C. more. The highest fluorine-content carbon monofluoride known to the prior art is only slightly more stable than graphite, having a combustion temperature of 650° C. However, a carbon monofluoride having a maximum superstoichiometric fluorine-to-carbon ratio of approximately 1.12/1.00 has a combustion temperature of 726° C. and consequently is significantly more oxidation-resistant than graphite and lower fluorine-content carbon monofluorides.

The snow white carbon monofluoride having a maximum superstoichiometric fluorine-to-carbon ratio produced in accordance with this invention is a stable, chemically inert material. Tests have indicated that this material will not decompose at a temperature of 600° C. and pressure of 725,450 p.s.i.a. Although its coefficient of friction is similar to that of graphite, its wear and load carrying capacity is much greater.

As indicated previously, carbon monofluorides can be produced by reacting fluorine gas with carbon. Although hydrogen fluoride has previously been used in some instances to catalyze the reaction between fluorine gas and carbon, it has been found that neither this material nor any other material is needed as a catalyst to produce either sub- or superstoichiometric carbon monofluorides. All that is needed to get the carbon and fluorine atoms to form carbon-fluorine bonds is to impart sufficient kinetic energy to the atoms to cause a sufficiently large number of high energy collisions therebetween. This can be accomplished by increasing the pressure, the temperature, or both.

Contrary to the teachings of the prior art, the carbon-fluorine reaction at atmospheric pressure can be carried to completion at temperatures in excess of 600° C., and up to about 645° C., without causing explosions, producing unstable products, or encountering reproducibility problems. At atmospheric pressure, temperatures in the range from about 620° C. to about 635° C. have been found suitable for producing carbon monofluorides having fluorine-to-carbon ratios of 0.99/1.00 or greater. However, if the reaction is carried out within the temperature range of about 624° C. to about 630° C., a carbon monofluoride having a maximum superstoichiometric fluorine-to-carbon ratio of approximately 1.12/1.00 can be obtained.

It has also been discovered that stable carbon monofluorides having superstoichiometric fluorine-to-carbon ratios can be quickly prepared at superatmospheric pressures up to about 250 p.s.i.a., without any difficulty as to the reproducibility or controllability of the preparation. At pressures between about 225 p.s.i.a. and about 250 p.s.i.a., the reaction between the carbon and the fluorine gas will proceed at room temperature (approximately 25° C.). A very fast, exothermic reaction, essentially an explosion, usually occurs at pressures above about 250 p.s.i.a. The carbon and fluorine must be heated above room temperature at pressures below about 225 p.s.i.a. It has been found that at a particular temperature the reaction between the carbon and the fluorine gas will proceed at a pressure at which a pressure drop occurs at the fluorine gas pressure is increased at that particular temperature. For example, at 300° C. it has been found that as the fluorine gas pressure is slowly increased a pressure drop up to as much as 25 p.s.i.a. will occur when the pressure reaches 175 p.s.i.a. This pressure drop indicates the initiation of a fairly rapid reaction between the carbon and the fluorine gas.

In both the atmospheric and superatmospheric preparations of carbon monofluorides, the temperature and/or pressure at which the carbon-fluorine reaction proceeds must be maintained for a minimum period of time in order to cause the reaction to go substantially to completion and produce a carbon monofluoride having the highest obtainable fluorine-to-carbon ratio at that temperature and/or pressure. The longer the temperature and/or pressure are maintained, the larger the number of high energy collisions between the carbon atoms and the fluorine atoms or molecules and, consequently, the greater the probability that each carbon atoms will form a bond with a fluorine atom. However, as would be obvious, the time required in each instance is affected by the size of the carbon particles, the amount of the carbon sample in the reaction vessel, and the amount or flow rate of the fluorine gas.

In the atmospheric preparations of carbon monofluorides as contrasted to the superatmospheric preparations, the number of fluorine atoms or molecules present in the reaction vessel at any one time is inherently relatively small. For many types of apparatus, the flow rate of the fluorine gas must be limited so that the carbon particles and the reaction product will not be carried out of the reaction vessel by the fluorine gas stream. Consequently, once the reaction temperature is reached, it must be maintained for a minimum period of time before any carbon monofluoride is formed and for a longer period of time before most of the carbon sample is converted to a carbon monofluoride having a maximum superstoichiometric fluorine-to-carbon ratio.

For example, when using one and one-half grams of graphite powder and a fluorine gas flow rate of four cubic centimeters per minute, it has been found that the reaction temperature of 627° C. must be maintained for approximately 4 hours to convert most of the graphite sample to a carbon monofluoride having a fluorine-to-carbon ratio of 0.7/1.0 and for approximately 13 hours to convert the sample to a carbon monofluoride having a maximum superstoichiometric ratio of 1.12/1.00.

As previously mentioned, these minimum periods of time are affected by the size of the carbon particles and the amount of the carbon sample, as well as the flow rate of the fluorine gas. For instance, in the example in the preceding paragraph, if less than a gram of graphite powder is inserted into the reaction vessel and the fluorine gas flow rate is increased to six cubic centimeters per minute, the minimum time periods will be reduced since the probability that each carbon atom in the graphite sample will quickly collide with a fluorine atom or molecule to form a bond therebetween is increased. On the other hand, if the fluorine gas flow rate is held constant and the graphite particle size and/or the amount of the sample is increased, the minimum time period will be increased.

In contrast to the atmospheric preparations of carbon monofluorides, the reaction between fluorine and carbon at high pressures occurs much faster since there are a relatively large number of high energy-fluorine atoms or molecules present in the reaction vessel at one time, thereby substantially increasing the probability that each carbon atom will quickly collide with a fluorine atom or molecule and form a bond therebetween. Once the reaction pressure and temperature are reached a carbon monofluoride is formed. However, in order to obtain a carbon monofluoride having a maximum superstoichiometric fluorine-to-carbon ratio, the reaction temperature and pressure must be maintained for a short period of time, such as 5 to 15 minutes when using particulate carbon. The reaction between the carbon and the fluorine will be substantially complete when the reaction pressure ceases dropping as fluorine gas is added to the reaction vessel to approximately maintain the reaction pressure.

Failure to bring the fluorine gas pressure back up to about the reaction pressure or an increase in the fluorine gas pressure above the reaction pressure will result in the production of carbon monofluorides which do not have a maximum superstoichiometric fluorine-to-carbon ratio. As with the atmospheric preparations of carbon monofluorides, the period of time the reaction temperature and pressure must be maintained to produce a maximum superstoichiometric carbon monofluoride depends on the size of the carbon particles, the amount of the carbon sample and the volume of the fluorine gas. For instance, it takes as little as 5 to 15 minutes to completely react particulate carbon while it takes at least two or three times as long if the same amount of carbon is in one solid piece. This is because the carbon-fluorine reaction proceeds much more slowly once the exterior surfaces of non-particulate carbon particles are fluorinated. Furthermore, if other than particulate carbon is used, the drop in the reaction pressure as fluorine gas is being added to maintain the reaction pressure will often not be immediately observable, as is usually the case with particulate carbon, once the exterior surfaces of the carbon particles are fluorinated.

The formation of stable carbon monofluoride films on various shapes of solid carbon can be accomplished by using with slight modifications either the atmospheric or the superatmospheric preparations described above. To produce stable carbon monofluoride films having thicknesses ranging from about 0.5 millimeter to about 1.0 millimeter at atmospheric pressure, the reaction temperature must be maintained for a period of time between about one hour and three hours, with the optimum period being between about one and one-half hours and two and one-half hours. It has been found that the carbon monofluoride films start to slowly flake off if the reaction temperature is maintained for longer than approximately three hours. Moreover, if the reaction temperature is maintained for a long enough period of time, the entire piece or pieces of solid carbon, regardless of shape, will eventually be transformed into small particles of a carbon monofluoride. The fluorine-to-carbon ratio of the resulting carbon monofluoride reaction product is determined by the reaction temperature.

In producing carbon monofluoride films at superatmospheric pressure, the reaction temperature and pressure must be maintained for a short period of time, such as three to ten minutes, until a stable carbon monofluoride film is formed on the piece or pieces of solid carbon. A stable film is usually formed when there ceases to be an immediate drop in the reaction pressure as fluorine gas is added to the reaction vessel to approximately maintain the reaction pressure. However, the cessation of an immediate drop in reaction pressure need not be used in subsequent runs as an indication when a stable film is formed once the period of time for maintaining the reaction temperature and reaction pressure is determined for a specific set of reaction conditions. As with atmospheric preparations of carbon monofluoride films, the maintenance of the reaction pressure and temperature beyond the time necessary to form a stable film results in the slow flaking off of the carbon monofluoride and the eventual transformation of all of the carbon into small particles of a carbon monofluoride.

Carbon monofluoride films can be formed on various shapes of solid carbon, such as rods, spheres, plates, hollow cylinders and gaskets. One of the obvious advantages in fluorinating the exterior surfaces of pieces of solid carbon is the increased oxidation-resistance obtained. Such objects would have applications as self-lubricating washers, sleeves, bearings, etc.

It has also been found that carbon fibers and filaments can be fluorinated in the same manner as other forms of carbon. Such fibers would have utility as reinforcements in composite materials with either epoxy or other resin materials, or with metal matrices like titanium, aluminum and magnesium. The carbon monofluoride film would provide increased oxidation-resistance and would also act as a diffusion barrier between the carbon fiber and the matrix material. A composite material containing carbon monofluoride films on carbon fibers may be particularly adapted for use in constructing the outer surfaces of nose cones of space re-entry vehicles or similar objects subject to severe thermal cycles, especially in regard to reducing the interference to sensitive radio or microwave communication devices contained in these objects caused by free-electrons generated by the high temperature conditions.

Previous to the present invention, great difficulty was encountered in producing at atmospheric pressure high fluorine-content carbon monofluorides which were white in color. Even if a near-white carbon monofluoride was produced, it was found almost impossible to reproduce the preparation to make additional amounts of the same fluorine-content carbon monofluoride. The same problem to a lesser extent was encountered in reproducing the preparations of relatively low fluorine-content carbon monofluorides which were gray in color. It has been discovered that this problem can be obviated by precisely controlling the reaction temperature so that it does not vary more than ±3° C. Thus, the maintenance of precise temperature control, as described, will allow the reproduction of the preparations of carbon monofluorides having stoichiometries between approximately 0.68/1.00 and 1.12/1.00.

Turning now to the drawings, a typical fixed bed apparatus in which carbon monofluorides can be prepared at atmospheric pressure is shown in FIG. 1. The apparatus includes reaction vessel 1, which in this case is cylindrical, through which a gas may be passed and boat 2, or a similar shaped container, which is placed in the reaction vessel so that the gas can pass thereover. Both reaction vessel 1 and boat 2 must be made of a material, such as nickel, which will not react with fluorine. Heating apparatus 3, usually an electrical resistance furnace, is placed in any suitable manner around reaction vessel 1 so that the materials therein can be heated to high temperatures.

In the preferred method of using the apparatus shown in FIG. 1, boat 2 is placed in reaction vessel 1 near its center after particulate carbon 4, that is, carbon particles or powder, is first placed in the boat. Helium or some other inert gas is first passed through reaction vessel 1 and over carbon 4 at a temperature in excess of 120° C. in order to drive off substantially all the air and moisture. Fluorine gas, at a constant flow rate, is then passed through reaction vessel 1 and over boat 2 containing carbon 4. Simultaneously, by means of heating apparatus 3, the temperature in reaction vessel 1 is slowly increased until it reaches a temperature of approximately 627° C. This temperature is maintained for such a period of time as to allow a complete reaction between the carbon and fluorine atoms, thus producing a carbon monofluoride having a substantially maximum superstoichiometric fluorine-to-carbon ratio. Before the reaction product is removed from reaction vessel 1, the vessel is cooled and flushed with helium or other insert gas.

Figure 2:
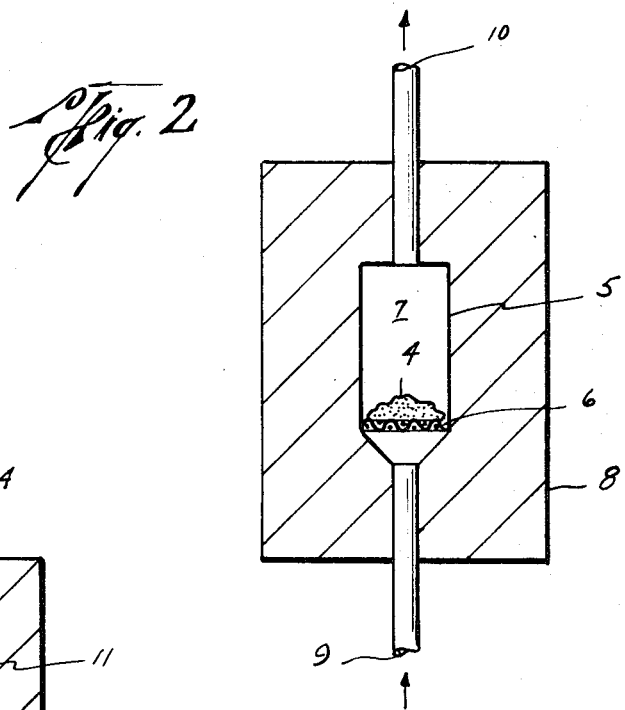
FIG. 2 is an elevation of a fluidized bed apparatus through which a vertical transverse section has been taken.

In FIG. 2, the fluidized bed apparatus consists of vertical reaction vessel 5 through which a gas may be passed upwards therethrough. Screen 6 is placed horizontally in the lower portion of reaction chamber 7 in vessel 5 and is of such a mesh that it will prevent particulate carbon 4 placed thereon from sifting through. Heating apparatus 8 of any suitable type, although preferably an electrical resistance furnace is placed around vertical reaction vessel 5 so that the materials in reaction chamber 7 can be heated to high temperatures. Both reaction vessel 5 and screen 6 are made of nickel or other fluorine-resistant materials.

The procedure in using the fluidized bed apparatus shown in FIG. 2 consists of first placing particulate carbon 4 on screen 6, and then flushing vertical reaction vessel 5 with helium or some other inert gas at a temperature in excess of 120° C. for such a period of time as to drive off substantially all the air and moisture. Following these steps, fluorine gas is introduced into vertical reaction vessel 5 through bottom opening 9. The flow rate of the fluorine gas is such that particulate carbon 4 will be partially suspended in reaction chamber 7 but not so great as to carry the carbon out upper opening 10 of reaction vessel 5. While fluorine gas is being introduced into reaction vessel 5, heating apparatus 8 is used to heat the reaction vessel to a temperature of approximately 627° C. This temperature is maintained for such a period of time as to produce a carbon monofluoride having a substantially maximum superstoichiometric fluorine-to-carbon ratio. After the reaction has been completed, reaction vessel 5 is cooled and flushed with helium or other inert gas before the carbon monofluoride reaction product supported on screen 6 is removed.

Figure 3:
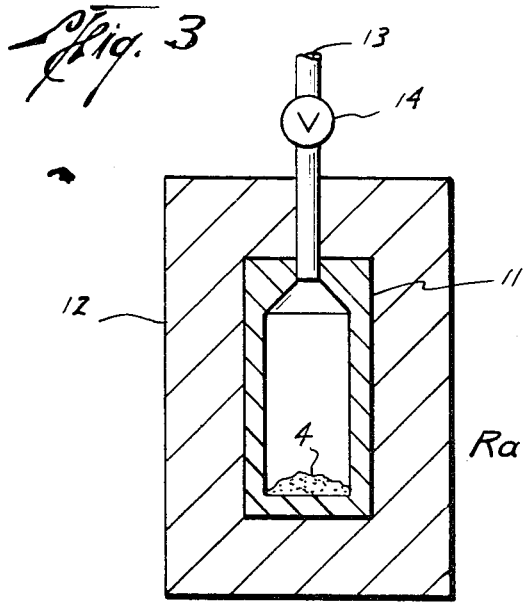
FIG. 3 is an elevation of a high pressure reaction vessel through which a vertical transverse section has been taken.

The apparatus shown in FIG. 3 is used in the superatmospheric preparations of carbon monofluorides. Reaction vessel 11 is a high pressure vessel made of nickel or other fluorine-resistant material. In opening 13 to vessel 11 is valve 14. Reaction vessel 11 is placed in heating apparatus 12 of any suitable type, but which is preferably an electrical resistance furnace.

In the combination high temperature and high pressure preparation of carbon monofluorides using the apparatus shown in FIG. 3, particulate carbon 4 is initially placed in the bottom of reaction vessel 11. The next step consists of placing reaction vessel 11 in heating apparatus 12 and heating the vessel to a temperature in excess of 100° C. Reaction vessel 11 is then evacuated of substantially all the air and moisture present therein, by using conventional vacuum apparatus now shown, before being filled with fluorine gas through opening 13. To determine the reaction pressure at a particular temperature, reaction vessel 11 is first heated to the particular temperature and then the pressure is slowly increased by adding fluorine gas through opening 13. A too rapid increase in pressure or an increase in pressure to a pressure above the reaction pressure may cause an explosion. When a pressure drop of approximately 5 to 25 p.s.i.a. is observed, the reaction pressure, the pressure at which the pressure drop starts to occur, has been reached. Fluorine gas is continuously added to reaction vessel 11 until the reaction pressure can be maintained without any further pressure drop, thereby indicating that the reaction has gone substantially to completion. After cooling and evacuation of the fluorine gas, the reaction product is removed from reaction vessel 11. Once the reaction pressure has been determined for a particular temperature, it is immaterial in subsequent runs whether the temperature or the pressure is increased first, or whether they are simultaneously increased. Furthermore, once the period of time for which the reaction temperature and pressure must be maintained is determined for a specific set of reaction conditions, it is not necessary in subsequent runs where the same reaction conditions are present to use the cessation in the drop in pressure as the indication when the carbon-fluorine reaction has gone substantially to completion.

In the high pressure preparation of carbon monofluorides which does not require the addition of external heat, the apparatus shown in FIG. 3, except for heating apparatus 2, is used. After particulate carbon 4 is placed in reaction vessel 11, substantially all the air is evacuated from the vessel by the use of conventional vacuum apparatus not shown. Fluorine gas is then slowly introduced into reaction vessel 11 until a pressure drop of approximately 5 to 25 p.s.i.a. is observed. A too rapid increase in pressure or an increase in the pressure to above approximately 250 p.s.i.a. before the reaction has gone substantially to completion will usually result in an explosion. At the reaction pressure, the pressure at which the pressure drop first occurs, which is usually at about 225 p.s.i.a., a relatively rapid reaction will occur between the carbon and fluorine atoms, resulting in the release of a considerable amount of heat, to produce a carbon monofluoride having a substantially maximum superstoichiometric fluorine-to-carbon ratio. The exact reaction pressure may vary slightly depending on the rate of the addition of the fluorine gas and the temperature. To insure that the reaction goes to completion, fluorine gas is added to reaction vessel 11 to maintain approximately the reaction pressure or a pressure up to about 250 p.s.i.a. until no further pressure drop occurs. The carbon-fluorine reaction will usually be complete within approximately 5 to 15 minutes. After cooling reaction vessel 11 and evacuating the flourine gas, the carbon monofluoride reaction product is removed from the vessel.

The following examples are illustrative of the methods for preparing carbon monofluoride according to this invention.

EXAMPLE I

The following is an example of the procedure utilizing the fixed bed apparatus shown in FIG. 1. Approximately one and one-half grams of finely powdered graphite 4 were placed in nickel boat 2, which was approximately one-half inch by twelve inches by one-half inch. Boat 2 was then placed in a one inch I.D. cylindrical nickel reaction vessel 1. Except for its ends, reaction vessel 1 was then enclosed in electrical resistance furnace 3. To remove substantially all air and moisture from reaction vessel 1, helium gas at a flow rate of four cubic centimeters per minute was passed through the reaction vessel and over graphite 4 in boat 2 for approximately thirty minutes at a temperature of 200° C. Fluorine gas was then passed through reaction vessel 1 at a flow rate of four cubic centimeters per minute and the temperature was raised to 627° C. and maintained for a period of thirteen hours. Reaction vessel 1 was then flushed with helium and the snow white reaction product in nickel boat 2 was removed from the reaction vessel. Analyses of the reaction product showed that the fluorine-to-carbon ratio was 1.12/1.00.

Table I indicates the critical nature of the temperature of 627° C.±3° C. in producing a carbon monofluoride having a maximum superstoichiometric fluorine-to-carbon ratio at atmospheric pressure. Except for varying the temperature as indicated in Table I, the procedure for preparing carbon monofluorides using the fixed bed apparatus as outlined in Example I was followed, including the use of the same amount of graphite powder, one and one-half grams, and the same fluorine gas flow rate, four cubic centimeters per minute. In each instance the reaction was maintained at the indicated temperature for a period of time in excess of thirteen hours.

TABLE I

| Temperature, ° C. | Composition of reaction product, flourine-to-carbon ratio | Appearance of reaction product |
| --- | --- | --- |
| Less than 400 | (1) | Original graphite color. |
| 400–475 | 0.68/1.00 | Black with a slight grayish tinge. |
| 500 | 0.75/1.00 | Black with a grayish tinge. |
| 590 | 0.80/1.00 | Steel gray. |
| 605 | 0.96/1.00 | Light gray. |
| 615 | 0.99/1.00 | Grayish white. |
| 620 | 1.00/1.00 | Near white. |
| 627±3 | 1.12/1.00 | Snow white. |
| 635 | 0.99/1.00 | White with some black soot. |
| 645 | 0.75/1.00 | Dark gray to black soot. |
| 650 | (2) | Black soot. |

1 Carbon with traces of fluorine.
2 Variable under 0.65/1.00.

It has been found that carbon monofluorides having various fluorine-to-carbon ratios as shown in Table I can be reproduced without any difficulty by maintaining the indicated temperature for that ratio as the average reaction temperature with a maximum fluctuation of ±3° C. For example, a carbon monofluoride having a fluorine-to-carbon ratio of 0.80/1.00 can be reproduced by maintaining an average reaction temperature of 590° C. with fluctuations limited to the range from about 587° C. to about 593° C. The reproducibility of the preparation of a carbon monofluoride having any ratio by the above-described temperature control procedure assumes that the reaction temperature is maintained for the minimum period of time necessary for the reaction to go substantially to completion at that temperature.

Table II indicates the composition and appearance of the reaction product resulting from the atmospheric preparation of carbon monofluorides at a temperature of 627° C.±3° C. when the period of time at which the temperature was maintained was varied. Again the same procedure as outlined in Example I was used.

TABLE II

| Time, hours: | Composition of reaction product, flourine-to-carbon ratio | Appearance of reaction product |
| --- | --- | --- |
| 4 | 0.70/1.00 | Gray. |
| 6 | 0.85/1.00 | Light gray. |
| 8 | 0.99/1.00 | Whitish. |
| 10 | 1.08/1.00 | White. |
| 13 | 1.12/1.00 | Snow white. |

EXAMPLE II

The following is an example of the procedure utilizing the fixed bed apparatus shown in FIG. 1. Approximately one and one-half grams of finely powdered graphitic carbon black 4 were placed in nickel boat 2 which was approximately one-half inch by twelve inches by one-half inch. Boat 2 was then placed in a one inch I.D. cylindrical nickel reaction vessel 1. Except for its ends, reaction vessel 1 was then enclosed in electrical resistance furnace 3. To remove substantially all air and moisture from reaction vessel 1, helium gas at a flow rate of four cubic centimeters per minute was passed through the reaction vessel and over graphitic carbon black 4 in boat 2 for approximately thirty minutes at a temperature of 200° C. Fluorine gas was then passed through reaction vessel 1 at a flow rate of four cubic centimeters per minute and the temperature was raised to 627° C. and maintained for a period of thirteen hours. Reaction vessel 1 was then flushed with helium and the snow white reaction product in nickel boat 2 was removed from the reaction vessel. Analyses of the reaction product showed that the fluorine-to-carbon ratio was 1.12/1.00.

EXAMPLE III

The following is an example of the procedure utilizing the fixed bed apparatus shown in FIG. 1 to produce a carbon monofluoride film on a hollow carbon cylinder. A six inch hollow graphite cylinder, three-eighths inch O.D. and one-fourth inch I.D., was placed in nickel boat 2, which was approximately one-half inch by twelve inches by one-half inch. Boat 2 was then placed in a one inch I.D. cylindrical nickel reaction vessel 1. Except for its ends, reaction vessel 1 was then enclosed in electrical resistance furnace 3. To remove substantially all air and moisture from reaction vessel 1, helium gas at a flow rate of four cubic centimeters per minute was passed through the reaction vessel and over and through the graphite hollow cylinder in boat 2 for approximately thirty minutes at a temperature of 200° C. Fluorine gas was then passed through reaction vessel 1 at a flow rate of four cubic centimeters per minute and the temperature was raised to 627° C. and maintained for a period of two hours. Reaction vessel 1 was then flushed with helium and the hollow cylinder having a snow white color was removed from the reaction vessel. The thickness of the carbon monofluoride film was found to be approximately 0.60 millimeter.

EXAMPLE IV

The following is an example of the procedure using the fluidized bed apparatus shown in FIG. 2. Approximately six grams of finely powdered graphite 4 were placed on nickel screen 6 in the lower portion of reaction chamber 7. At a temperature of 200° C. reaction vessel 5 was flushed with ten cubic centimeters per minute of hellium gas for one hour. Fluorine gas was then introduced into reaction vessel 5 through bottom opening 9 at a flow rate of twelve cubic centimeters per minute, and the temperature of the reaction vessel was raised to 627° C. and maintained for sixteen hours. Subsequently vessel 5 was cooled and flushed with helium gas for one hour before the reaction product on screen 6 was removed. Analyses of the reaction product showed that the fluorine-to-carbon ratio was 1.12/1.00.

EXAMPLE V

In the combination high temperature and high pressure preparation using the high pressure apparatus shown in FIG. 3, approximately three grams of finely powdered graphite were added to nickel reaction vessel 11. After vessel 11 was placed into electrical resistance furnace 12, it was heated to a temperature in excess of 100° C. and then evacuated with a vacuum apparatus for a period in excess of thirty minutes to remove substantially all the air and moisture. Fluorine gas was then slowly introduced into vessel 11 until a pressure of 50 p.s.i.a. was obtained. Valve 14 was then closed and vessel 11 was heated to a temperature of 300° C. The pressure was slowly raised until a pressure drop of approximately 15 p.s.i.a. occurred at a pressure of 175 p.s.i.a. For approximately ten minutes, additional fluorine gas was supplied to reaction vessel 11 to maintain the pressure at 175 p.s.i.a. At this time the pressure stopped dropping. Vessel 11 was then cooled and evacuated before the reaction product was removed therefrom. On analysis, the reaction product was found to have a fluorine-to-carbon ratio of 1.12/1.00.

EXAMPLE VI

The following is an example of the combination high temperature and high pressure preparation using the high pressure apparatus shown in FIG. 3 for the production of a carbon monofluoride film on a graphite rod. A six inch by one-half inch graphite rod was inserted into nickel reaction vessel 11. After vessel 11 was placed into electrical resistance furnace 12, it was heated to a temperature in excess of 100° C. and then evacuated with a vacuum apparatus for a period in excess of thirty minutes to remove substantially all the air and moisture. Fluorine gas was then slowly introduced into vessel 11 until a pressure of 50 p.s.i.a. was obtained. Valve 14 was then closed and vessel 11 was heated to a temperature of 300° C. The pressure was slowly raised until a pressure drop of approximately 15 p.s.i.a. occurred at a pressure of 175 p.s.i.a. Additional fluorine gas was then supplied to reaction vessel 11 to maintain the pressure at 175 p.s.i.a. After approximately five minutes no immediate pressure drop was observed. Vessel 11 was then cooled and evacuated before the rod having a snow white color was removed therefrom. The rod was found to have a carbon monofluoride film thickness of approximately 0.70 millimeter.

EXAMPLE VII

The following is an example of the high pressure preparation of carbon monofluorides, where no heat is added, paration of carbon monofluorides, where no heat is added, using the apparatus shown in FIG. 3. Approximately three grams of finely powdered graphite 4 were placed in nickel reaction vessel 11. After reaction vessel 11 was evacuated with a vacuum apparatus for one hour to remove substantially all the air and moisture, fluorine gas was slowly introduced into vessel 11 until a pressure drop of approximately 20 p.s.i.a. was observed at a pressure of 225 p.s.i.a. At this time the skin temperature of reaction vessel 11 increased rapidly to approximately 110° C. Additional amounts of fluorine gas were added to vessel 11 for approximately ten minutes to maintain the pressure at approximately 225 p.s.i.a. To test the stability of the reaction product, the pressure was slowly raised to 350 p.s.i.a. and maintained for a period of four hours. The reaction product was then removed from vessel 11 after the pressure had been released and the vessel evacuated. Analyses of the reaction product showed that the fluorine-to-carbon ratio was 1.12/1.00.

Table III illustrates the range of temperature-pressure relationships for the preparation of a carbon monofluoride having a maximum superstoichiometric fluorine-to-carbon ratio of approximately 1.12/1.00.

TABLE III

| Temperature: | Pressure |
|---|---|
| 627° C. | Atmospheric. |
| 620° C. | p.s.i.a.  60 |
| 610° C. | do  125 |
| 300° C. | do  175 |
| 200° C. | do  210 |
| Room temperature | do  225 |

It would be obvious to persons skilled in the art that minor variations in the procedures of this invention may be used to produce stable carbon monofluorides of various stoichiometries in addition to those specifically set forth herein and that changes and modifications of the invention can be made. Insofar as such variations and modifications incorporate the true spirit of this invention, they are intended to be included within the scope of the appended claims.

We claim:

1. Carbon monofluoride having a superstoichiometric fluorine-to-carbon ratio of approximately 1.12/1.00 and having a combustion temperature in one atmosphere of oxygen of 726° C.

2. A controlled, reproducible method of preparing stable carbon monofluorides having fluorine-to-carbon ratios from about 1.00/1.00 to about 1.12/1.00 from carbon and fluorine at substantially atmospheric pressure comprising the steps of:
    (a) Heating the carbon in a gaseous fluorine atmosphere to a temperature in the range from about 620° C. to about 630° C.; and
    (b) Maintaining approximately the temperature in step (a) for such a period of time as to allow the reaction between the carbon and the fluorine to form carbon monofluoride.

3. The method according to claim 2 wherein the carbon is graphite.

4. The method according to claim 2 wherein the temperature in step (a) is maintained with a maximum variation of approximately ±3° C.

5. The method according to claim 2 wherein the carbon monofluorides are produced in the form of films on the carbon and the temperature in step (a) is maintained for a period of time in the range from about one hour to about three hours.

6. The method according to claim 5 wherein the carbon is graphite.

7. The method according to claim 2 wherein the carbon monofluorides have a superstoichiometric fluorine-to-carbon ratio of approximately 1.12/1.00 and the temperature in step (a) is in the range from about 624° C. to about 630° C.

8. The method according to claim 7 wherein the carbon is graphite.

9. The method according to claim 7 wherein the carbon monofluorides are produced in the form of films on the carbon and the temperature in step (a) is maintained for a period of time in the range from about one hour to about three hours.

10. The method according to claim 9 wherein the carbon is graphite.

11. The method according to claim 10 wherein the temperature in step (a) is maintained for a period of time in the range from about one and one-half hours to about two and one-half hours.

12. A controlled, reproducible method of preparing stable carbon monofluorides having fluorine-to-carbon ratios from about 1.00/1.00 to about 1.12/1.00 from carbon and fluorine gas at substantially atmospheric pressure in a reaction vessel comprising the steps of:
 (a) Placing the carbon in the reaction vessel;
 (b) Flowing the fluorine gas through the reaction vessel so that it passes over the carbon;
 (c) Heating the reaction vessel to a temperature in the range from about 620° C. to about 630° C; and
 (d) Maintaining approximately the temperature in step (c) for such a period of time as to allow the reaction between the carbon and the fluorine gas to form carbon monofluoride.

13. The method according to claim 12 wherein the carbon is particulate graphite.

14. The method according to claim 12 wherein the temperature in step (c) is maintained with a maximum variation of approximately ±3° C.

15. The method according to claim 12 wherein the carbon monofluorides are produced in the form of films on the carbon and the temperature in step (c) is maintained for a period of time in the range from about one hour to about three hours.

16. The method according to claim 15 wherein the carbon is graphite fiber.

17. The method according to claim 12 wherein the carbon monofluorides have a superstoichiometric fluorine-to-carbon ratio of approximately 1.12/1.00 and the temperature in step (c) is in the range from about 624° C. to about 630° C.

18. The method according to claim 17 wherein the carbon is particulate graphite.

19. The method according to claim 17 wherein the carbon monofluorides are produced in the form of films on the carbon and the temperature in step (c) is maintained for a period of time in the range from about one hour to about three hours.

20. The method according to claim 19 wherein the carbon is graphite fiber.

21. The method according to claim 20 wherein the temperature in step (c) is maintained for a period of time in the range from about one and one-half hours to about two and one-half hours.

22. A controlled, reproducible method of preparing stable carbon monofluorides having fluorine-to-carbon ratios from about 1.00/1.00 to about 1.12/1.00 from particulate carbon and fluorine gas as substantially atmospheric pressure in a fluidized bed apparatus comprising the steps of:
 (a) Placing the particulate carbon on a perforated support in the fluidized bed apparatus;
 (b) Flowing the fluorine gas upward through the perforated support to lift the particulate carbon into partial suspension in the fluidized bed apparatus;
 (c) Heating the fluidized bed apparatus to a temperature in the range from about 620° C. to about 630° C.; and
 (d) Maintaining approximately the temperature in step (c) for such a period of time as to allow the reaction between the carbon and the fluorine gas to form carbon monofluoride.

23. The method according to claim 22 wherein the carbon is graphite.

24. The method according to claim 22 wherein the temperature in step (c) is maintained with a maximum variation of approximately ±3° C.

25. A method according to claim 22 wherein the carbon monofluorides have a superstoichiometric fluorine-to-carbon ratio of approximately 1.12/1.00 and the temperature range in step (c) is in the range from about 624° C. to about 630° C.

26. The method according to claim 25 wherein the carbon is graphite.

27. A controlled, reproducible method of preparing stable carbon monofluorides having a superstoichiometric fluorine-to-carbon ratio of approximately 1.12/1.00 from carbon and fluorine gas under superatmospheric pressure below about 225 p.s.i.a. which comprises:
 (a) Reacting the carbon and the fluorine gas at a temperature and pressure determined by:
  (i) Maintaining the carbon and fluorine gas at a desired reaction temperature above room temperature and below about 627° C.; and
  (ii) Determining the reaction pressure by increasing the pressure of the fluorine gas at said desired reaction temperature to approximately a pressure at which a pressure drop occurs; and
 (b) Maintaining approximately the reaction temperature and the reaction pressure in step (a) for such a period of time as to allow the reaction between the carbon and fluorine gas to form carbon monofluoride.

28. The method according to claim 27 wherein the carbon is particulate graphite.

29. The method according to claim 27 wherein the carbon monofluorides are produced in the form of films on the carbon and the reaction temperature and the reaction pressure in step (a) are approximately maintained for such a period of time until there ceases to be an immediate pressure drop as fluorine gas is added to maintain approximately the reaction pressure.

30. The method according to claim 29 wherein the carbon is graphite.

31. A controlled, reproducible method of preparing stable carbon monofluorides having a superstoichiometric fluorine-to-carbon ratio of approximately 1.12/1.00 from carbon and fluorine gas under superatmospheric pressure at room temperature which comprises:
 (a) Reacting the carbon and fluorine gas at a reaction pressure determined by slowly increasing the pressure of the fluorine gas to approximately a pressure at which a pressure drop occurs; and
 (b) Maintaining the reaction pressure in step (a) for such a period of time as to allow the reaction between the carbon and fluorine gas to form carbon monofluoride.

32. The method according to claim 31 wherein the carbon is particulate graphite.

33. The method according to claim 31 wherein the fluorine gas pressure is slowly increased to approximately 225 p.s.i.a. and is maintained at a pressure in the range from about 225 p.s.i.a. to about 250 p.s.i.a. for such a period of time as to allow the reaction between the carbon and the fluorine gas to go substantially to completion.

34. The method according to claim 33 wherein the carbon is particulate graphite.

35. The method according to claim 31 wherein the carbon monofluorides are produced in the form of films on the carbon and the reaction pressure in step (a) is approximately maintained for such a period of time until there ceases to be an immediate pressure drop as fluorine gas is added to maintain approximately the reaction pressure.

36. The method according to claim 35 wherein the carbon is graphite.

References Cited

Watanabe, N., et al., "Studies on the Preparation of Fluorine and Its Compounds. VIII. The Formation Reaction of Graphic Fluoride," J. Electrochem. Soc., Japan, vol. 32, No. 1 (1964), pp. 17–25.

Ruff, V. O., et. al., "Die Reaktionprodukte der verschiedenen Kohlenstofformen mit Fluor 11," Zietschrift für Anorganische und allgemeine Chemie, February 1934, vol. 217, pp. 1–18.

OSCAR R. VERTIZ, Primary Examiner

G. ALVARO, Assistant Examiner

UNITED STATES PATENT OFFICE
CERTIFICATE OF CORRECTION

Patent No. 3,674,432                    Dated July 4, 1972

Inventor(s) John L. Margrave et al

It is certified that error appears in the above-identified patent and that said Letters Patent are hereby corrected as shown below:

Column 4, line 63, "at" should read -- as --

Column 5, line 6, "atoms" should read -- atom --

Column 7, line 50, "insert" should read -- inert --

Column 9, line 2, "flourine" should read -- fluorine --

Column 9, line 47, "flourine" should read -- fluorine --

Column 10, line 12, "flourine" should read -- fluorine --

Column 11, line 59, "paration of carbon monofluorides, where no heat is added" should be deleted.

Column 14, line 65, "Graphic" should read -- Graphite --

Signed and sealed this 26th day of December 1972.

(SEAL)
Attest:

EDWARD M. FLETCHER, JR.                ROBERT GOTTSCHALK
Attesting Officer                      Commissioner of Patents